(12) United States Patent
Kitamura

(10) Patent No.: US 10,021,192 B2
(45) Date of Patent: Jul. 10, 2018

(54) COMMUNICATION CONTROL DEVICE AND COMMUNICATION CONTROL METHOD

(71) Applicant: NEC CORPORATION, Tokyo (JP)

(72) Inventor: Hiroshi Kitamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 14/407,499

(22) PCT Filed: Mar. 21, 2013

(86) PCT No.: PCT/JP2013/001909
§ 371 (c)(1),
(2) Date: Dec. 12, 2014

(87) PCT Pub. No.: WO2014/002337
PCT Pub. Date: Jan. 3, 2014

(65) Prior Publication Data
US 2015/0127841 A1 May 7, 2015

(30) Foreign Application Priority Data
Jun. 25, 2012 (JP) .................................. 2012-141968

(51) Int. Cl.
*G06F 15/16* (2006.01)
*H04L 29/08* (2006.01)
(Continued)

(52) U.S. Cl.
CPC ...... *H04L 67/141* (2013.01); *H04L 29/12066* (2013.01); *H04L 69/163* (2013.01)

(58) Field of Classification Search
CPC ..... H04L 67/141; H04L 69/163; H04L 45/24; H04L 61/2007; H04L 63/0272;
(Continued)

(56) References Cited

U.S. PATENT DOCUMENTS

| 5,809,254 A | 9/1998 | Matsuzono |
| 6,519,636 B2 * | 2/2003 | Engel .................... H04L 47/10 370/229 |

(Continued)

FOREIGN PATENT DOCUMENTS

| JP | 05-028072 A | 2/1993 |
| JP | 07-028728 A | 1/1995 |

(Continued)

OTHER PUBLICATIONS

International Search Report for PCT/JP2013/001909 dated Jun. 25, 2013.

*Primary Examiner* — Zarni Maung
(74) *Attorney, Agent, or Firm* — Sughrue Mion, PLLC

(57) ABSTRACT

A communication control device includes: a parameter storage unit that stores each entry containing a communication parameter learned through a communication between communication nodes, a communication source IP address related to the communication, and a communication destination IP address related to the communication; and a parameter acquiring unit that acquires a communication source IP address and a communication destination IP address related to a communication to be newly started, extracts, from among plural entries stored in the parameter storage unit, at least one entry in which the number of bits matched between communication source IP addresses or communication destination IP addresses is more than or equal to a predetermined lower limit value which is lower than the total number of bits in an IP address, and acquires, on the basis of the extracted entry, an initial value of a communication parameter to be used in the communication to be newly started.

23 Claims, 19 Drawing Sheets

| COMMUNICATION DESTINATION IP ADDRESS | COMMUNICATION SOURCE IP ADDRESS | PATH MTU VALUE |
|---|---|---|
| 192.168.10.13 | 173.194.32.10 | |
| fc00::2580::3dfe: 5cb1:22ab | Fe80::2a0:deff: fc1b:fe1d | |
| | | |
| . . . | . . . | . . . |

(51) Int. Cl.
*H04L 29/12* (2006.01)
*H04L 29/06* (2006.01)
*G06F 12/00* (2006.01)

(58) Field of Classification Search
CPC ............. H04L 63/0428; H04L 61/2076; H04L 61/2092; H04L 61/6004; H04L 29/12216; H04L 45/28; H04L 63/1458; H04L 29/12301; H04L 29/1232; H04L 29/12801; H04L 45/00; H04L 61/35; H04L 63/04
USPC ......... 709/228, 230, 238, 245, 250; 370/254
See application file for complete search history.

(56) References Cited

U.S. PATENT DOCUMENTS

| | | | |
|---|---|---|---|
| 7,143,137 B2* | 11/2006 | Maufer | H04L 29/12018 709/205 |
| 7,143,188 B2* | 11/2006 | Maufer | H04L 29/06 709/245 |
| 7,471,779 B2* | 12/2008 | Kajiwara | H04M 15/06 379/100.01 |
| 7,626,928 B2* | 12/2009 | Kajiwara | H04L 45/00 370/230 |
| 2002/0059435 A1* | 5/2002 | Border | H04B 7/18582 709/228 |
| 2008/0019289 A1* | 1/2008 | Monden | H04W 40/14 370/254 |
| 2011/0125915 A1 | 5/2011 | Takei et al. | |

FOREIGN PATENT DOCUMENTS

| | | |
|---|---|---|
| JP | 2008-228219 A | 9/2008 |
| JP | 2009-177282 A | 8/2009 |
| WO | 2010/013469 A | 2/2010 |

* cited by examiner

FIG. 3

| TYPE OF PROTOCOL | COMMUNICATION DESTINATION IP ADDRESS | COMMUNICATION SOURCE IP ADDRESS | PORT NUMBER OF COMMUNICATION DESTINATION | PORT NUMBER OF COMMUNICATION SOURCE | SESSION PARAMETERS | | |
|---|---|---|---|---|---|---|---|
| | | | | | WINDOW SIZE | RTT | ... |
| TCP | 192.168.10.13 | 173.194.32.10 | 80 | 15 | | | ... |
| TCP | fc00::2580::3dfe: 5cb1:22ab | Fe80::2a0:deff: fc1b:fe1d | 443 | 100 | | | ... |
| UDP | ... | ... | ... | ... | | | ... |

FIG. 14

| COMMUNICATION DESTINATION IP ADDRESS | PREFIX LENGTH | TYPE OF UNREACHABILITY | | | |
|---|---|---|---|---|---|
| | | Network Unreachable | Host Unreachable | Service Unreachable | ... |
| 192.168.10.13 | 24 | 1 (YES) | 0 | 0 | |
| fc00::2580::3dfe:5cb1:22ab | 64 | 0 | 1 (YES) | 0 | |
| 192.168.2.40 | 16 | 0 | 1 (YES) | 0 | |
| ⋮ | | ⋮ | ⋮ | | ⋮ |

FIG. 16

| COMMUNICATION DESTINATION IP ADDRESS | COMMUNICATION SOURCE IP ADDRESS | PATH MTU VALUE |
|---|---|---|
| 192.168.10.13 | 173.194.32.10 | |
| fc00::2580::3dfe:5cb1:22ab | Fe80::2a0:deff:fc1b:fe1d | |
| | | |
| ⋮ | ⋮ | ⋮ |

US 10,021,192 B2

COMMUNICATION CONTROL DEVICE AND COMMUNICATION CONTROL METHOD

CROSS REFERENCE TO RELATED APPLICATIONS

This application is a National Stage of International Application No. PCT/JP2013/001909 filed Mar. 21, 2013, claiming priority based on Japanese Patent Application No. 2012-141968 filed Jun. 25, 2012, the contents of all of which are incorporated herein by reference in their entirety.

TECHNICAL FIELD

The present invention relates to an Internet Protocol (IP) communication technique.

BACKGROUND ART

In IP communications, various communication parameters are used. For example, there are IP addresses of a communication destination and a communication source, port numbers of the communication destination and the communication source, a Path MTU (Maximum Transmission Unit), a window size, a RTT (Round Trip Time), a retransmission timer, and the like. Furthermore, these communication parameters may include, for example, information as to whether or not communication is possible with the communication destination node, and the cause of an interrupted communication. Hereinafter, the term "communication parameter" as used herein means any information that may be used when IP communications are performed and is independent of network layers.

In IP communications, there exists a function (algorithm) that can learn such communication parameters and find them. With this function or algorithm, the communication parameters are optimally set to achieve, for example, scalability and distributed collaboration. For example, the Path MTU Discovery detects the minimum MTU of links on a path. Furthermore, a slow-start algorithm increases the number of transmitted segments, in other words, adjusts a window size every time ACK is received in order to avoid congestion. According to an Internet Control Message Protocol (ICMP), in the case where a communication with a communication destination node cannot be performed in a normal manner, a communication source node can recognize this fact (type=3) and the cause thereof (code=0 (Network Unreachable), 1 (Host Unreachable), and so on).

However, such a learning and finding function itself also increases workloads, and hence, the following method is proposed. Patent Document 1 described below proposes a method of: installing, in a Provider Backbone Bridge Network (PBBN), a provider backbone network (PBN) database storing information on MAC addresses of all devices that belong to each PBN; and achieving label switching transfer in the PBBN using information in this PBN database, thereby preventing the increase in the workload for learning addresses even if the number of the PBN increases. Patent Document 2 described below proposes a method of registering, in a retransmission timeout table, the maximum RTT value measured in each connection for each host computer serving as a communication target, and using the maximum RTT value as a retransmission timer for new connection, thereby eliminating calculation of the retransmission timeout for each connection, which is unnecessary wastage.

RELATED DOCUMENT

Patent Document

Patent Document 1: Japanese Patent Application Laid-open No. 2009-177282
Patent Document 2: Japanese Patent Application Laid-open No. H5-28072

SUMMARY OF THE INVENTION

Problem to be Solved by the Invention

However, such a learning and finding function as described above is not optimized so as to fit the current network performance and processing performance of communication devices or server devices.

For example, a communication mode between a client and a server has been shifting from a mode in which the frequency of establishment and close of connections is reduced to minimize the number of connections established, to a mode in which a large number of connections are established, and the connections are frequently established and closed. In a current environment where the network performance and the processing performance of devices are improved, such a new communication mode is highly likely to be more advantageous from the view point of application performance.

However, the learning and finding function described above is newly implemented every time connections are established, and hence, is not efficient in the new communication mode.

The present invention has been made in view of the problems as described above, and is to provide an IP communication technique that efficiently sets appropriate communication parameters.

Means for Solving the Problem

Each aspect of the present invention employs the following configurations to solve the problem described above.

A communication control device according to the first aspect includes: a parameter storage unit that stores each entry containing a communication parameter learned through a communication between communication nodes, a communication source IP address related to this communication, and a communication destination IP address related to this communication; and a parameter acquiring unit that acquires a communication source IP address and a communication destination IP address related to a communication to be newly started, extracts, from among plural entries stored in the parameter storage unit, at least one entry in which the number of bits matched between communication source IP addresses or communication destination IP addresses is more than or equal to a predetermined lower limit value which is lower than the total number of bits in an IP address, and acquires, on the basis of the extracted entry, an initial value of a communication parameter to be used in the communication to be newly started.

A communication control method according to the second aspect includes: storing, in a parameter storage unit, each entry containing a communication parameter learned through a communication between communication nodes, a communication source IP address related to this communication, and a communication destination IP address related to this communication; acquiring a communication source IP address and a communication destination IP address related to a communication to be newly started; extracting, from among a plurality of entries stored in the parameter storage unit, at least one entry in which the number of bits matched between communication source IP addresses or communication destination IP addresses is more than or equal to a predetermined lower limit value which is lower than the total number of bits in an IP address; and acquiring, on the basis of the extracted entry, an initial value of a communication parameter to be used in the communication to be newly started.

It should be noted that another aspect according to the present invention may include a program that causes a computer to realize the configuration of the communication device according to the first aspect described above, and a computer-readable storage medium that records such a program. This storage medium includes a non-transitory tangible medium.

Effect of the Invention

According to each of the aspects described above, it is possible to provide the IP communication technique that efficiently sets appropriate communication parameters.

BRIEF DESCRIPTION OF THE DRAWINGS

The above-described object and other objects of the present invention, and features and advantages of the present invention will be made further clear by the preferred embodiment described below and the following drawings attached thereto.

FIG. 3 is a diagram illustrating an example of communication parameters stored in a parameter storage unit according to the first exemplary embodiment.

FIG. 14 is a diagram illustrating an example of data in a parameter storage unit according to the second exemplary embodiment.

FIG. 16 is a diagram illustrating an example of data in a parameter storage unit according to the third exemplary embodiment.

DESCRIPTION OF EMBODIMENTS

Figure 1:
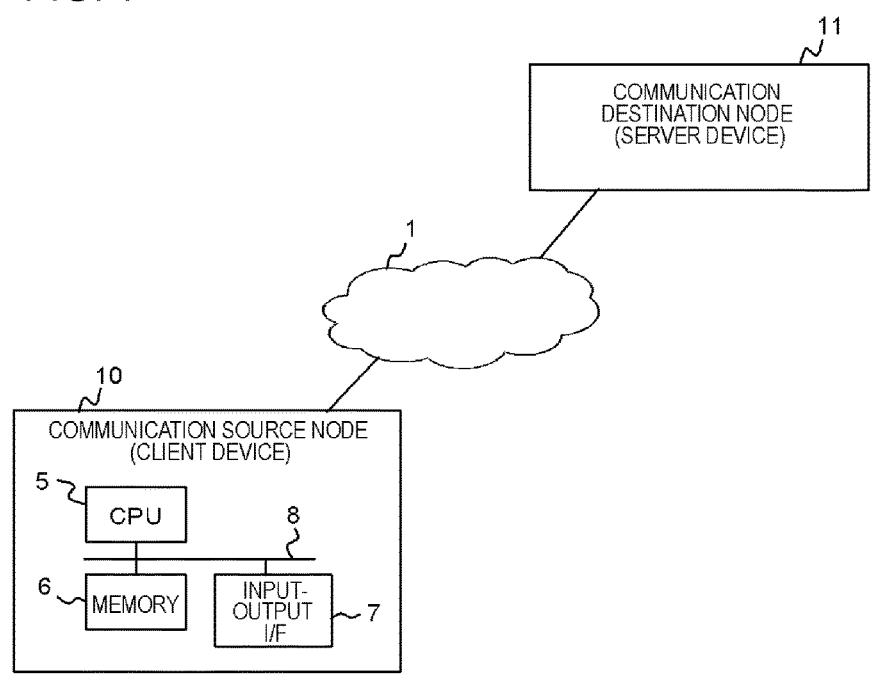
FIG. 1 is a diagram schematically illustrating an example of a hardware configuration of a communication source node according to a first exemplary embodiment.

Below, exemplary embodiments according to the present invention will be described. Note that the exemplary embodiments described below are merely examples, and the present invention is not limited to configurations of the exemplary embodiments described below.

A communication control device according to this exemplary embodiment includes: a parameter storage unit that stores entries each containing a communication parameter learned through a communication between communication nodes, a communication source IP address related to this communication, and a communication destination IP address related to this communication; and a parameter acquiring unit that acquires a communication source IP address and a communication destination IP address related to a communication to be newly started, extracts, from among the entries stored in the parameter storage unit described above, at least one entry in which the number of bits matched between communication source IP addresses or communication destination IP addresses is more than or equal to a predetermined lower limit value which is lower than the total number of bits in an IP address, and acquires, on the basis of the extracted entry, an initial value of a communication parameter to be used in the communication to be newly started.

In the communication control device, each communication parameter learned through the communication between communication nodes is stored in the parameter storage unit together with the communication source IP address and the communication destination IP address. Here, the communication parameter includes IP addresses of the communication destination and the communication source, port numbers of the communication destination and the communication source, Path MTU, a window size, RTT, a retransmission timer, a possibility of communication with the communication destination node, the cause of impossibility of communication, and other information, and means any information that can be used when IP communications are performed and is independent of network layers.

In the communication control device described above, the initial value of the communication parameter to be used in the communication to be newly started is acquired using the entries stored in the parameter storage unit. In other words, in this exemplary embodiment, the communication parameters that have been learned through the previous communications are inherited by the communication to be newly started.

Thus, according to this exemplary embodiment, it is possible to prevent the process of learning communication parameters and the process of finding communication parameters from overlapping to each other, whereby it is possible to reduce workload occurring as a result of the process of learning and the process of finding. Furthermore, the communication parameters learned through the previous communications have appropriate values that conform to communication environments, and hence, it is possible to appropriately maintain quality of subsequent communications. Such an effect becomes stronger in the case of the current communication mode in which a large number of connections are established and the connections are frequently established and closed.

Furthermore, in this exemplary embodiment, a range in which communication parameters learned through the previous communications are inherited is not limited to communications established between communication ends (a pair of a communication source IP address and a communication destination IP address) fully matching with each other but is expanded to include communications whose communication conditions are close to each other. More specifically, the inherited range for the communication parameters includes communications in which the number of bits matched between communication source IP addresses or communication destination IP addresses is more than or equal to a predetermined lower limit value which is lower than the total number of bits in an IP address. The predetermined lower limit value is set, for example, to 24 (bits) in the case of IPv4, and is set, for example, to 64 (bits) in the case of IPv6.

With this configuration, for example, in the case where communication destination nodes are different between a previous communication stored in the parameter storage unit and a subsequent communication to be newly started, it is possible to achieve substantially the same communication quality using the same communication parameters if the communication destination nodes of these communications are located in an environment where communication conditions are close to each other. In this respect, the same applies to the communication source node. More specifically, the fact that communication conditions are close to each other can be expressed as a relationship between communication conditions that satisfy required communication quality even if the same communication parameters are used.

As described above, according to this exemplary embodiment, even if the inherited range for communication parameters is expanded, it is possible to extensively enjoy the above-described effect obtained through inheritance of the communication parameters without causing any problems such as deteriorations in communication quality.

Below, the exemplary embodiment described above will be described in more detail.

First Exemplary Embodiment

[System Configuration]

FIG. 1 is a diagram schematically illustrating an example of a hardware configuration of a communication source node 10 according to a first exemplary embodiment. The communication source node 10 is connected to a communication destination node 11 through a network 1 in a manner that they can communicate with each other. The network 1 includes, for example, a public network such as the Internet, a wide area network (WAN), a local area network (LAN), and a wireless communication network.

The communication source node 10 includes, for example, a central processing unit (CPU) 5, a memory 6, and an input-output interface (I/F) 7, each of which is connected to each other, for example, through a bus 8. The memory 6 includes, for example, a random access memory (RAM), a read only memory (ROM), a hard disk, and a portable storage medium. The input-output I/F 7 is connected to a network interface (NI) device that performs communications with other communication nodes (for example, the communication destination node 11) through the network 1. The input-output I/F 7 may be connected to a user interface device such as a display device and an input device. The communication destination node 11 has a hardware configuration similar to that of the communication source node 10.

The communication source node 10 is, for example, a client device, and the communication destination node 11 is, for example, a server device. Note that, in this exemplary embodiment, it is only necessary that the communication source node 10 and the communication destination node 11 are communication devices that can perform IP communications, and the hardware configurations thereof are not limited.

Figure 2:
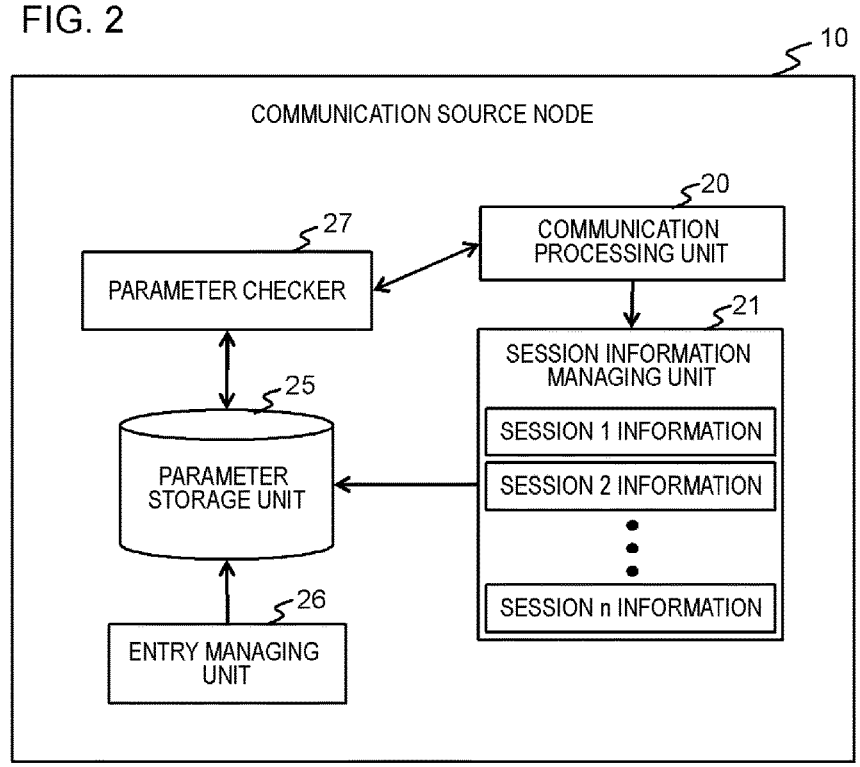
FIG. 2 is a diagram schematically illustrating an example of a process configuration of the communication source node according to the first exemplary embodiment.

FIG. 2 is a diagram schematically illustrating an example of a process configuration of the communication source node 10 according to the first exemplary embodiment. As illustrated in FIG. 2, the communication source node 10 includes, for example, a communication processing unit 20, a session information managing unit 21, a parameter storage unit 25, an entry managing unit 26, and a parameter checker 27. In the communication source node 10, each of the processing units described above is realized with the CPU 5 running a program stored in the memory 6. This program is installed, for example, from a portable storage medium such as a compact disc (CD) and a memory card, or other computers on a network through the input-output I/F 7, and is stored in the memory 6.

The communication processing unit 20 achieves a desired communication with a desired communication party in response to a request from an application (not illustrated). In the first exemplary embodiment, a session between the communication destination node 11 and the communication source node 10 is exemplified as the desired communication. The session means a unit of connection in a Transmission Control Protocol (TCP) and a User Datagram Protocol (UDP). The unit of connection in the TCP is also called a connection. The UDP is connectionless, and hence, the unit of connection in the UDP is specified with IP addresses and port numbers of both ends of the communication. For example, the communication processing unit 20 establishes and closes a TCP connection with the communication destination node 11, for example, by 3-way handshake and so on.

The session information managing unit 21 manages information (session information) on each session processed by the communication processing unit 20. This session information is retained in a session information retaining unit (not illustrated). The session information contains communication parameters learned through each session. For example, a window size learned through a slow-start algorithm is reflected in the session information retaining unit. This session information may be called a protocol control block (PCB), or TCP Control Block. Note that, in general, the session information managed by the session information managing unit 21 is deleted in response to the ending of each session.

The parameter storage unit 25 stores the communication parameters of each session managed by the session information managing unit 21 separately from the session information retaining unit of the session information managing unit 21. The communication parameters stored in the parameter storage unit 25 are not deleted in response only to the ending of each session. Details of the communication parameters are reflected in the parameter storage unit 25 in response to updating and adding (excluding deleting) of session information by the session information managing unit 21.

FIG. 3 is a diagram illustrating an example of communication parameters stored in the parameter storage unit 25 according to the first exemplary embodiment. As illustrated in FIG. 3, the parameter storage unit 25 stores, for example, a type of protocol, a communication destination IP address, a communication source IP address, a communication destination port number, a communication source port number, a window size, and an RTT, each of which concerns each session. As for the type of protocol, data indicating, for example, TCP and UDP according to protocols of each session are stored.

Each session can be identified on the basis of the type of protocol, the communication destination IP address, the communication source IP address, the communication destination port number, and the communication source port number. Hereinafter, the type of protocol, the communication destination IP address, the communication source IP address, the communication destination port number, and the communication source port number are also collectively referred to as session identification information. Furthermore, a communication parameter other than this session identification information from among the communication parameters stored in the parameter storage unit 25 is also referred to as a session parameter.

In the example illustrated in FIG. 3, the window size and the RTT are given as examples of the session parameter. However, this exemplary embodiment does not limit the session parameter stored in the parameter storage unit 25. The parameter storage unit 25 may store all the pieces of the session information managed by the session information managing unit 21, or may store part of the session information.

The entry managing unit 26 manages entries (session parameters) stored in the parameter storage unit 25. For example, the entry managing unit 26 performs, for example, data aging, and garbage collection. For example, during the data aging, the entry managing unit 26 has predetermined validity period information, and an entry for which this predetermined validity period has elapsed after the last updated time is deleted.

Furthermore, it may be possible to employ a configuration in which the entry managing unit 26 receives, for example, error information and retransmission information concerning each session from the communication processing unit 20, judges, on the basis of the information received, a degree of stability of a network in which each session is performed, and determines deletion of each entry according to this degree of stability. For example, the entry managing unit 26 may delete a session parameter for a session having an error or retransmission occurring therein, or may delete a session parameter for a session in which an error or retransmission occurs a predetermined number of times.

Upon receiving a request from the communication processing unit 20, the parameter checker 27 acquires, from the parameter storage unit 25, an initial value of a session parameter for use in a session to be newly started. More specifically, the parameter checker 27 searches for an entry appropriate for being inherited by a session to be newly started, from among entries stored in the parameter storage unit 25, and acquires a session parameter contained in this entry as an initial value of a session parameter for the session to be newly started. The parameter checker 27 may be called a parameter acquiring unit. Specific processes performed by the parameter checker 27 will be described in detail in a section of Example of Operation.

[Example of Operation]

Figure 4:
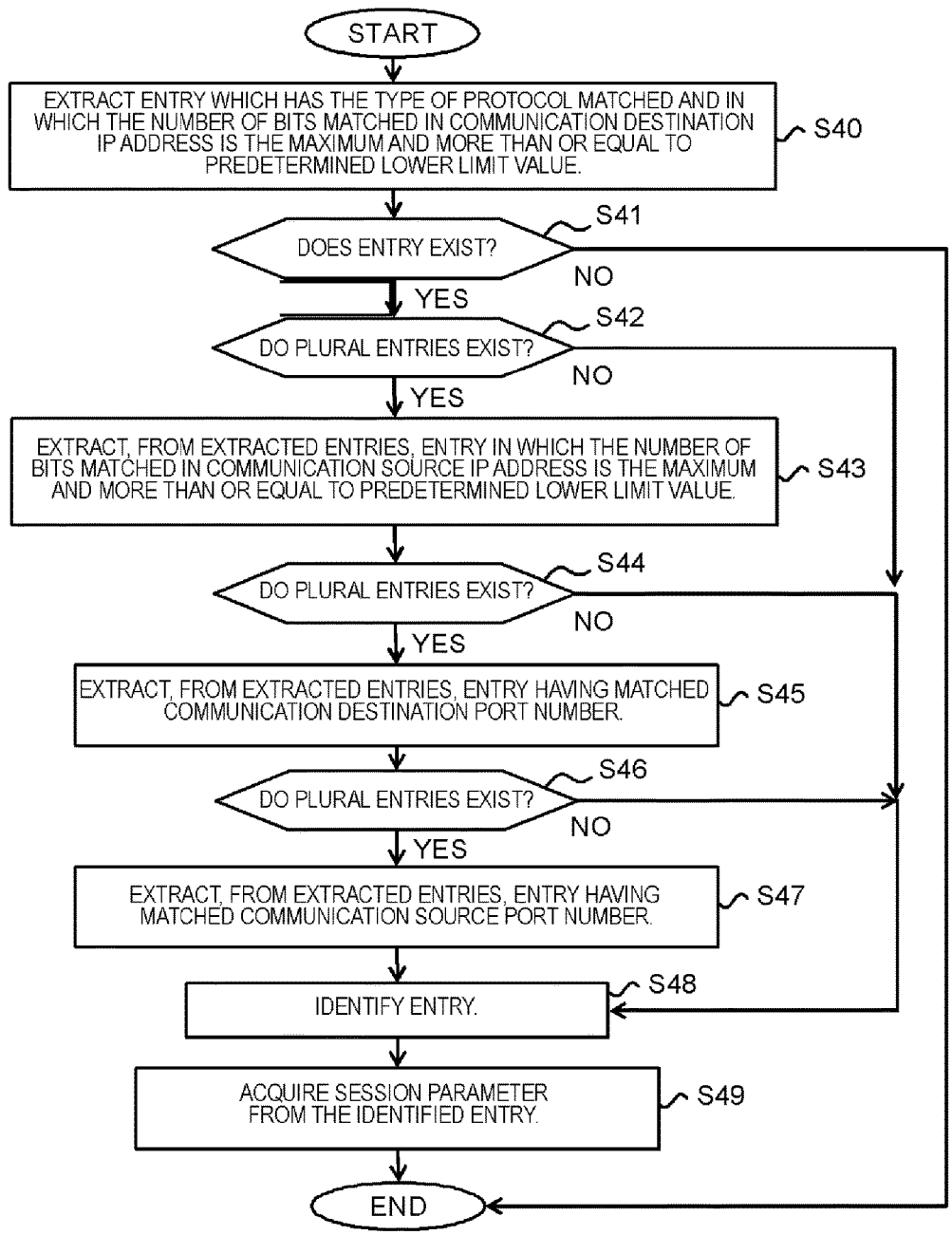
FIG. 4 is a flowchart showing an example of operations performed by a parameter checker according to the first exemplary embodiment.

FIG. 4 is a flowchart showing an example of operations performed by the parameter checker 27 according to the first exemplary embodiment. The parameter checker 27 is requested by the communication processing unit 20 to provide the initial value of the session parameter for use in the session to be newly started. In this request, the type of protocol, the communication destination IP address, the communication source IP address, the communication destination port number, and the communication source port number for the session to be newly started are specified.

The parameter checker 27 extracts, from the parameter storage unit 25, one or more entries which have the type of protocol matched and in which the number of bits matched in the communication destination IP address is the maximum and more than or equal to a predetermined lower limit value (S40). This predetermined lower limit value is set to a value smaller than the total number of bits in an IP address, and is stored in the memory 6 in advance. Note that this predetermined lower limit value will be described later in more detail.

In the case where there exists no entry that meets the above-described condition (S41; NO), the parameter checker 27 notifies the communication processing unit 20 that there exists no communication parameter to be inherited. On the other hand, in the case where one entry that meets the condition is extracted (S41; YES, S42; NO), the parameter checker 27 acquires a session parameter from the extracted entry (S48, S49).

In the case where plural entries that meet the condition are extracted (S42; YES), the parameter checker 27 further narrows down the extracted entries according to the communication source IP address. More specifically, the parameter checker 27 extracts, from the extracted entries, one or more entries in which the number of bits matched in the communication source IP address is the maximum and more than or equal to a predetermined lower limit value (S43).

In the case where plural entries that meet the condition are extracted (S44; YES), the parameter checker 27 further narrows down the extracted entries according to the communication destination port number. More specifically, the parameter checker 27 extracts, from the extracted entries, one or more entries having a matched communication destination port number (S45).

In the case where plural entries that meet the condition are extracted (S46; YES), the parameter checker 27 further narrows down the extracted entries according to the communication source port number. More specifically, the parameter checker 27 extracts, from the extracted entries, one or more entries having a matched communication source port number (S47).

The parameter checker 27 identifies one entry from the extracted entries (S48). More specifically, in the case where no entry that meets the condition is extracted in S43 (S44;

NO), the parameter checker 27 identifies one given entry from among entries extracted in S40 (S48). In the case where one entry is extracted in S43 (S44; NO), the parameter checker 27 identifies the extracted entry (S48). In the case where no entry that meets the condition is extracted in S45 (S46; NO), the parameter checker 27 identifies one given entry from among the entries extracted in S43 (S48). In the case where one entry is extracted in S45 (S46; NO), the parameter checker 27 identifies the extracted entry (S48). In the case where no entry that meets the condition is extracted in S47, the parameter checker 27 identifies one given entry from among the entries extracted in S45 (S48). In the case where at least one entry is extracted in S47, the parameter checker 27 identifies one entry from the extracted at least one entry (S48).

The parameter checker 27 acquires the session parameter from the identified entry (S49). The parameter checker 27 provides the communication processing unit 20 with the acquired session parameter. With these operations, this session parameter is used as an initial value in the session to be newly started.

In FIG. 4, an example is given in which the session parameter to be inherited is narrowed down using all the pieces of session identification information. However, it may be possible to use only the type of protocol and the communication destination IP address depending on items stored in the parameter storage unit 25. For example, in the case where only one IP address of the communication source node 10 itself is stored as the communication source IP address in the parameter storage unit 25, narrowing down in connection with the communication source IP address is not necessary. In this case, steps S42 to S47 in FIG. 4 can be omitted.

Furthermore, as compared with the IP address, the communication port number does not strongly indicate whether the communication conditions are close or not. Thus, it may be possible to omit steps S45 and S47 in which narrowing down is performed using the communication source port number and the communication destination port number. In this case, steps S45 to S47 in FIG. 4 are omitted.

[Inherited Range for Session Parameter]

In the first exemplary embodiment, the session parameters learned through previous communications are inherited not only by sessions having communication ends (a pair of a communication source IP address and a communication destination IP address) fully matching with each other but also by sessions having communication conditions close to each other. Such an inherited range for the session parameter is determined according to the predetermined lower limit value described above.

Figure 5:
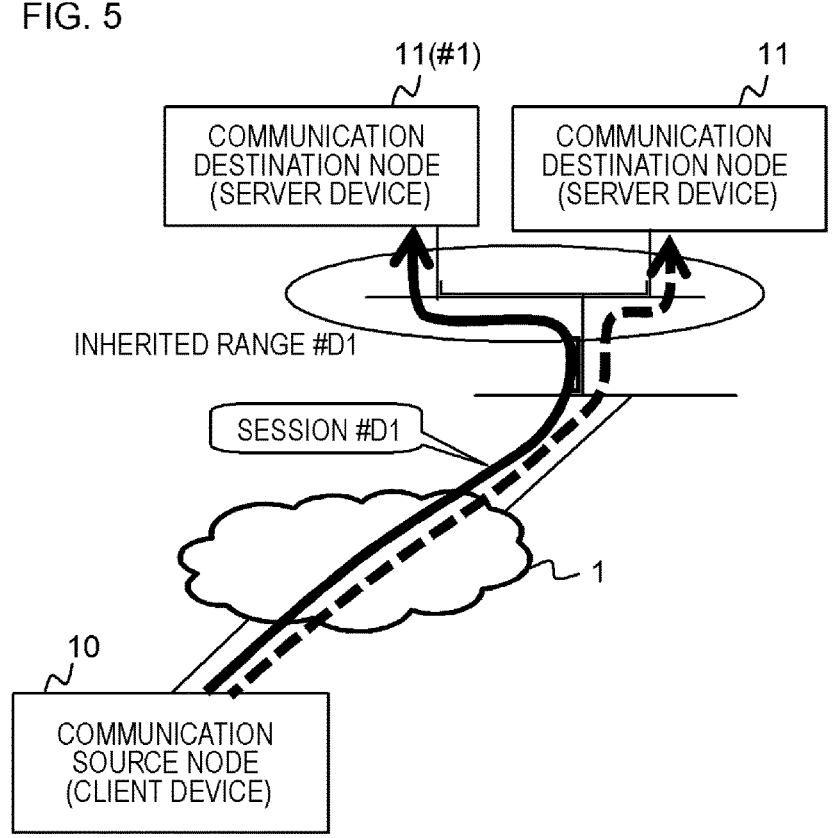
FIG. 5 is a diagram schematically illustrating a first example of an inherited range for session parameters according to the first exemplary embodiment.

FIG. 5 is a diagram schematically illustrating a first example of an inherited range for a session parameter according to the first exemplary embodiment. Here, it is assumed that the communication source node 10 attempts to newly start a session with the communication destination node 11, and the parameter storage unit 25 stores a session parameter learned through a session #D1 between the communication source node 10 and a communication destination node 11 (#1). Furthermore, it is assumed that the communication destination node 11 (#1) is located in the subnet same as the communication destination node 11 is. The subnet means a network with a range in which communication is possible, and the range does not extend beyond a router.

In an example illustrated in FIG. 5, in the case where the predetermined lower limit value described above is set to a value corresponding to a certain subnet, the parameter checker 27 extracts, from the parameter storage unit 25, an entry corresponding to the session #D1 between the communication destination node 11 (#1) and the communication source node 10. With this operation, the session parameter learned through the session #D1 between the communication destination node 11 (#1) and the communication source node 10 is inherited by a new session (inherited range #D1).

Figure 6:
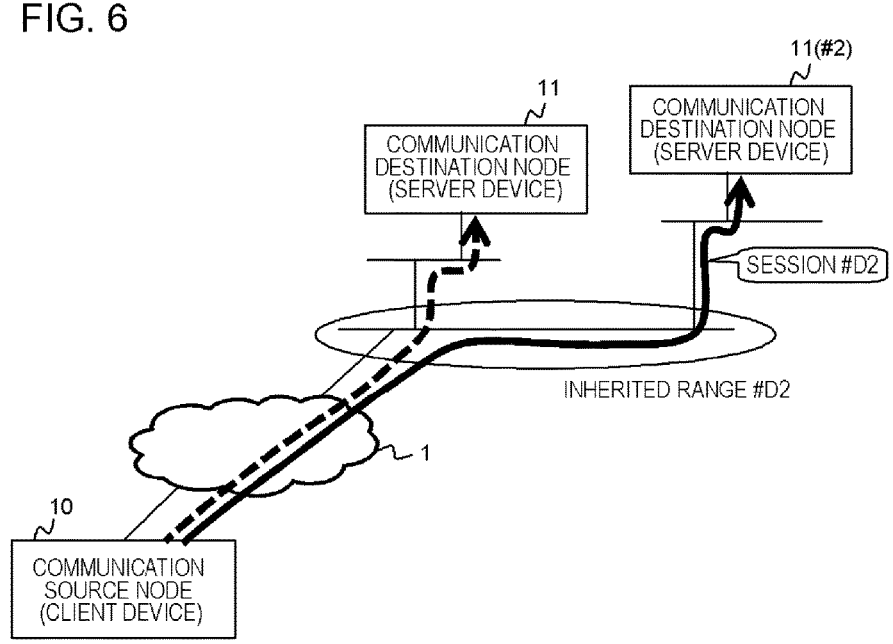
FIG. 6 is a diagram schematically illustrating a second example of an inherited range for session parameters according to the first exemplary embodiment.

FIG. 6 is a diagram schematically illustrating a second example of an inherited range for a session parameter according to the first exemplary embodiment. Here, it is assumed that the communication source node 10 attempts to newly start a session with a communication destination node 11, and the parameter storage unit 25 stores a session parameter learned through a session #D2 between the communication source node 10 and a communication destination node 11 (#2). Furthermore, it is assumed that the communication destination node 11 (#2) is located in a subnet different from where the communication destination node 11 is, but is located in the same site as the communication destination node 11. Here, the site means a network that extends across plural subnets and has a predetermined range, and is, for example, a network having a range covered by an Internet Service Provider (ISP), or a company network.

In an example illustrated in FIG. 6, in the case where the predetermined lower limit value described above is set to a value corresponding to a certain site, the parameter checker 27 extracts, from the parameter storage unit 25, an entry corresponding to the session #D2 between the communication destination node 11 (#2) and the communication source node 10. With this operation, the session parameter learned through the session #D2 between the communication destination node 11 (#2) and the communication source node 10 is inherited by a new session (inherited range #D2).

Incidentally, in the example illustrated in FIG. 6, in the case where the session parameter learned through the session #D1 between the communication destination node (#1) and the communication source node 10 in the example illustrated in FIG. 5 is also stored in the parameter storage unit 25, the parameter checker 27 extracts, from the parameter storage unit 25, an entry corresponding to the session #D1 between the communication destination node 11 (#1) and the communication source node 10. This is because, as shown in the process S40 in FIG. 4, the entry in which the number of bits matched in the communication destination IP address is the maximum and more than or equal to a predetermined lower limit value is extracted.

Figure 7:
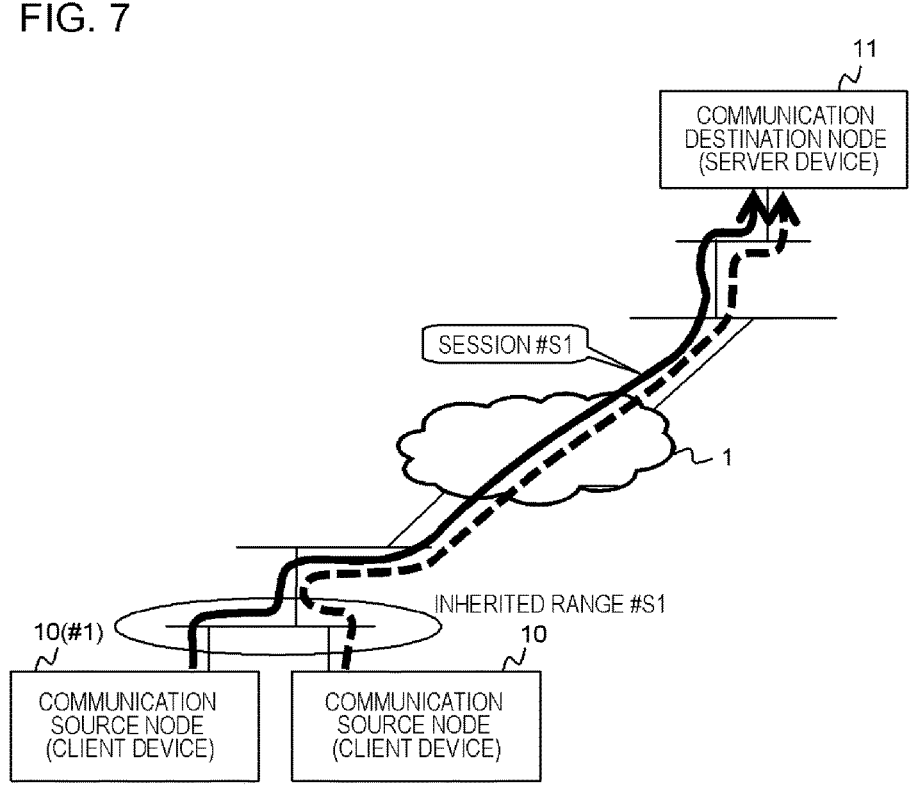
FIG. 7 is a diagram schematically illustrating a third example of an inherited range for session parameters according to the first exemplary embodiment.

FIG. 7 is a diagram schematically illustrating a third example of an inherited range for a session parameter according to the first exemplary embodiment. Here, it is assumed that the communication source node 10 attempts to newly start a session with the communication destination node 11, and the parameter storage unit 25 stores a session parameter learned through a session #S1 between a communication source node 10 (#1) and the communication destination node 11. Furthermore, it is assumed that the communication source node 10 (#1) is located in the subnet same as the communication source node 10 is.

In an example illustrated in FIG. 7, in the case where the predetermined lower limit value described above is set to a value corresponding to a certain subnet, the parameter checker 27 extracts, from the parameter storage unit 25, an entry corresponding to the session #S1 between the communication source node 10 (#1) and the communication destination node 11. With this operation, the session parameter learned through the session #S1 between the communication source node 10 (#1) and the communication destination node 11 is inherited by a new session (inherited range #S1).

Figure 8:
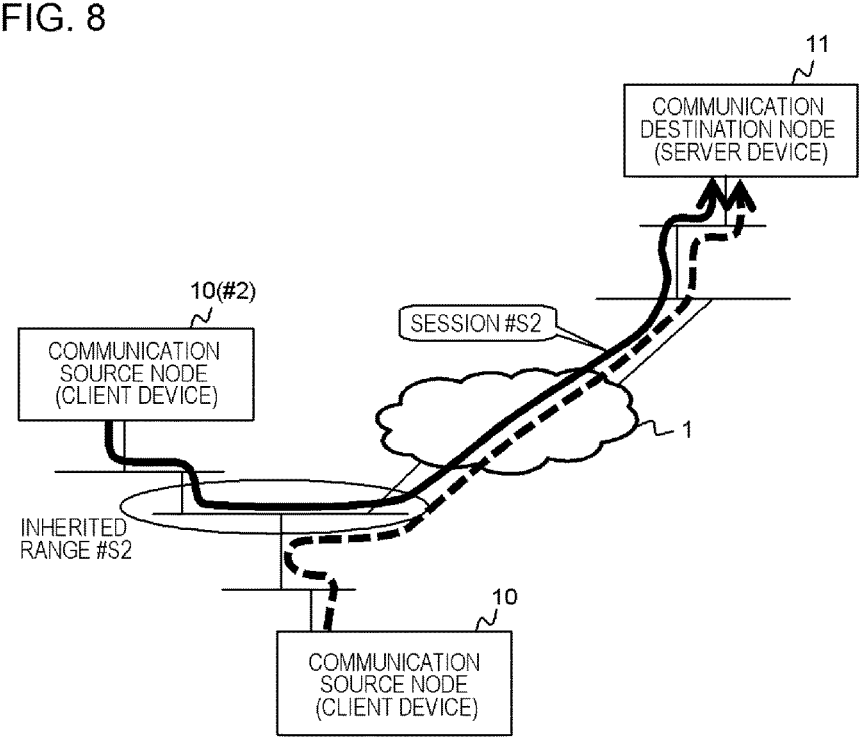
FIG. 8 is a diagram schematically illustrating a fourth example of an inherited range for session parameters according to the first exemplary embodiment.

FIG. 8 is a diagram schematically illustrating a fourth example of an inherited range for a session parameter according to the first exemplary embodiment. Here, it is assumed that the communication source node 10 attempts to newly start a session with the communication destination node 11, and the parameter storage unit 25 stores a session parameter learned through a session #S2 between a communication source node 10 (#2) and the communication destination node 11. Furthermore, it is assumed that the communication source node 10 (#2) is located in a subnet different from where the communication source node 10 is, but is located in the same site as the communication source node 10.

In an example illustrated in FIG. 8, in the case where the predetermined lower limit value is set to a value corresponding to a certain site, the parameter checker 27 extracts, from the parameter storage unit 25, an entry corresponding to the session #S2 between the communication source node 10 (#2) and the communication destination node 11. With this operation, the session parameter learned through the session #S2 between the communication source node 10 (#2) and the communication destination node 11 is inherited by a new session (inherited range #S2).

Incidentally, in the example illustrated in FIG. 8, in the case where the session parameter learned through the session #S1 between the communication source node 10 (#1) and the communication destination node 11 in the example illustrated in FIG. 7 is also stored in the parameter storage unit 25, the parameter checker 27 extracts, from the parameter storage unit 25, an entry corresponding to the session #S1 between the communication source node 10 (#1) and the communication destination node 11. This is because, as shown in the process S43 in FIG. 4, the entry in which the number of bits matched in the communication source IP address is the maximum and more than or equal to a predetermined lower limit value is extracted.

Figure 9:
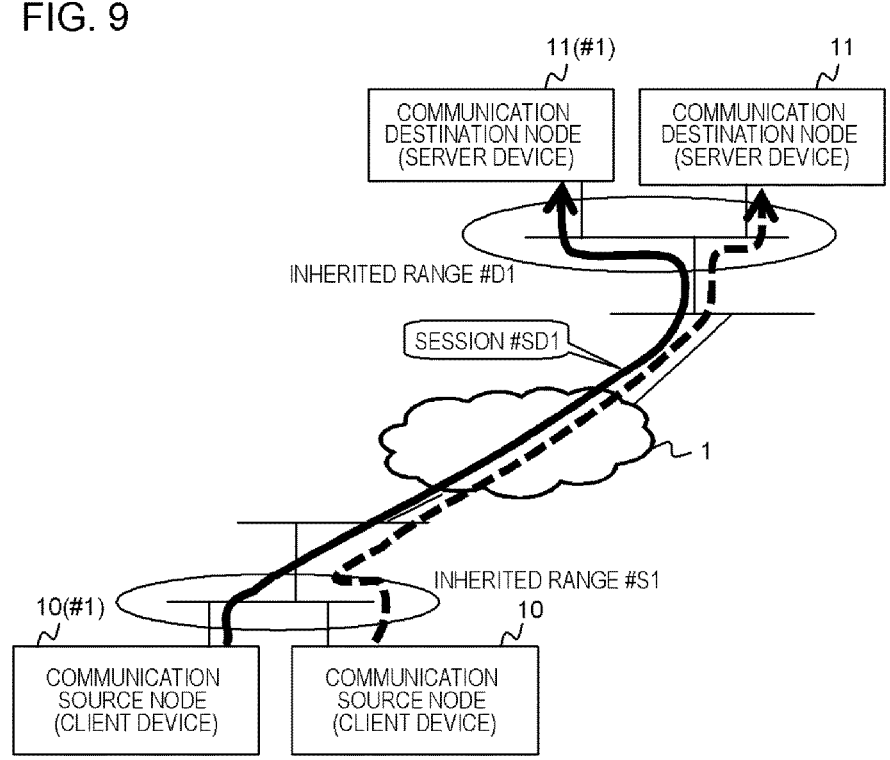
FIG. 9 is a diagram schematically illustrating a fifth example of an inherited range for session parameters according to the first exemplary embodiment.

FIG. 9 is a diagram schematically illustrating a fifth example of an inherited range for a session parameter according to the first exemplary embodiment. Here, it is assumed that the communication source node 10 attempts to newly start a session with the communication destination node 11, and the parameter storage unit 25 stores a session parameter learned through a session #SD1 between the communication source node 10 (#1) and the communication destination node 11 (#1). Furthermore, it is assumed that the communication source node 10 (#1) belongs to the subnet same as the communication source node 10 does, and the communication destination node 11 (#1) belongs to the subnet same as the communication destination node 11 does.

In an example illustrated in FIG. 9, in the case where the predetermined lower limit value described above is set to a value corresponding to a certain subnet, the parameter checker 27 extracts, from the parameter storage unit 25, an entry corresponding to the session #SD1 between the communication source node 10 (#1) and the communication destination node 11 (#1). With this operation, the session parameter learned through the session #SD1 between the communication source node 10 (#1) and the communication destination node 11 (#1) is inherited by a new session (inherited ranges #D1 and #S1).

Figure 10:
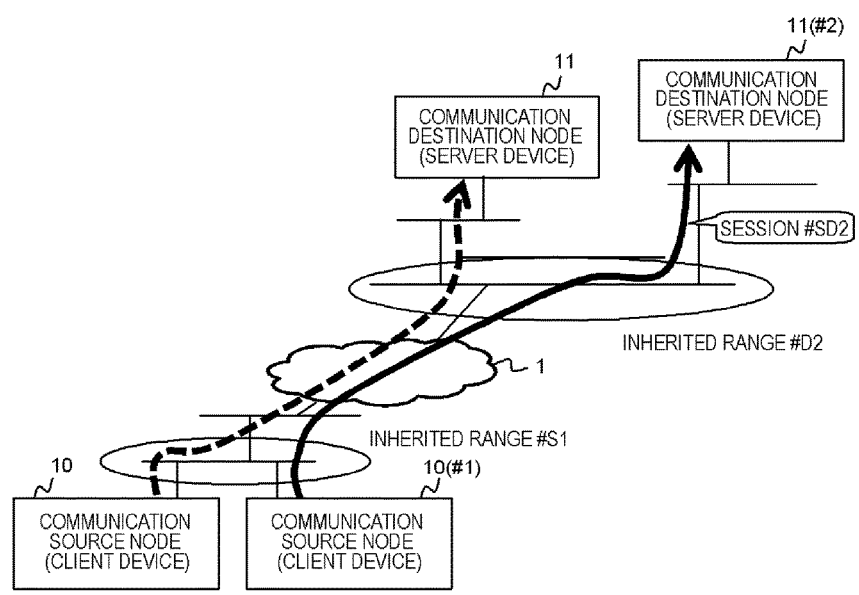
FIG. 10 is a diagram schematically illustrating a sixth example of an inherited range for session parameters according to the first exemplary embodiment.

FIG. 10 is a diagram schematically illustrating a sixth example of an inherited range for a session parameter according to the first exemplary embodiment. Here, it is assumed that the communication source node 10 attempts to newly start a session with the communication destination node 11, and the parameter storage unit 25 stores a session parameter learned through a session #SD2 between the communication source node 10 (#1) and the communication destination node 11 (#2). Furthermore, it is assumed that the communication source node 10 (#1) belongs to the subnet same as the communication source node 10 does, and the communication destination node 11 (#2) is located in a subnet different from where the communication destination node 11 but is located in the site same as the communication destination node 11.

In an example illustrated in FIG. 10, in the case where the predetermined lower limit value described above is set to a value corresponding to a certain site, the parameter checker 27 extracts, from the parameter storage unit 25, an entry corresponding to the session #SD2 between the communication source node 10 (#1) and the communication destination node 11 (#2). With this operation, the session parameter learned through the session #SD2 between the communication source node 10 (#1) and the communication destination node 11 (#2) is inherited by a new session (inherited ranges #D2 and #S1).

Figure 11:
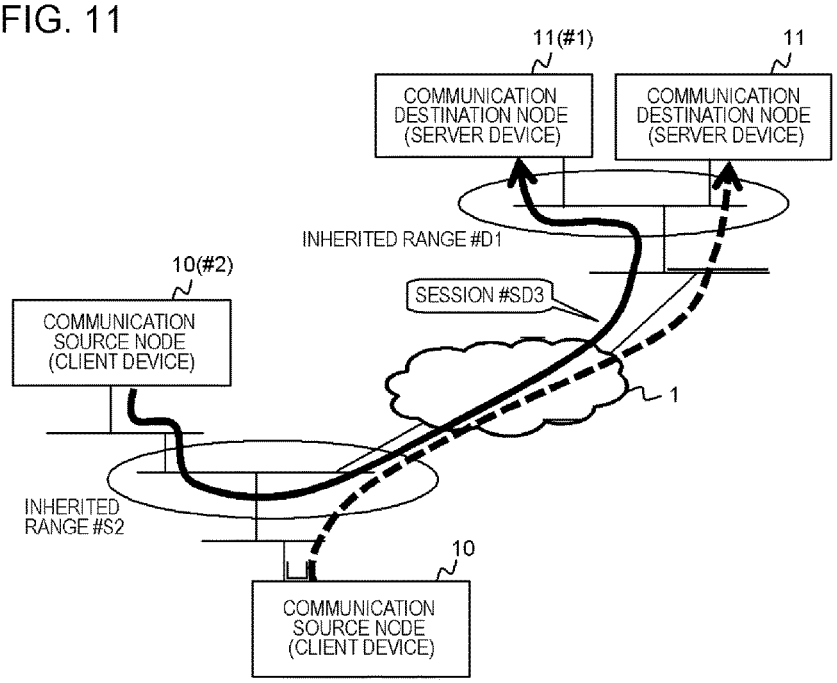
FIG. 11 is a diagram schematically illustrating a seventh example of an inherited range for session parameters according to the first exemplary embodiment.

FIG. 11 is a diagram schematically illustrating a seventh example of an inherited range for a session parameter according to the first exemplary embodiment. Here, it is assumed that the communication source node 10 attempts to newly start a session with the communication destination node 11, and the parameter storage unit 25 stores a session parameter learned through a session #SD3 between the communication source node 10 (#2) and the communication destination node 11 (#1). Furthermore, it is assumed that the communication source node 10 (#2) is located in a subnet different from where the communication source node 10 is but is located in the site same as the communication source node 10, and the communication destination node 11 (#1) is located in the subnet same as the communication destination node 11.

In an example illustrated in FIG. 11, in the case where the predetermined lower limit value described above is set to a value corresponding to a certain site, the parameter checker 27 extracts, from the parameter storage unit 25, an entry corresponding to the session #SD3 between the communication source node 10 (#2) and the communication destination node 11 (#1). With this operation, the session parameter learned through the session #SD3 between the communication source node 10 (#2) and the communication destination node 11 (#1) is inherited by a new session (inherited ranges #D1 and #S2).

Figure 12:
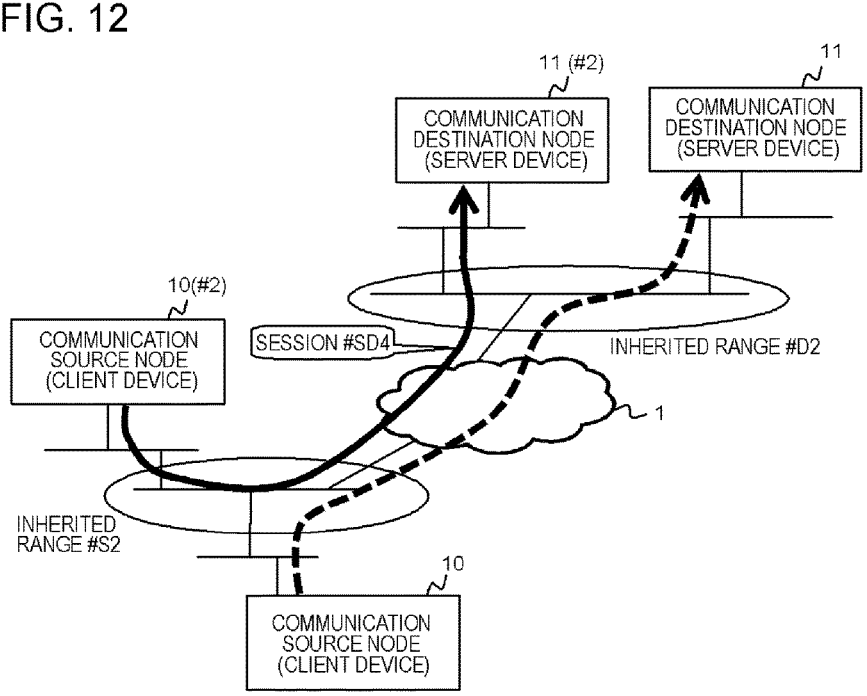
FIG. 12 is a diagram schematically illustrating an eighth example of an inherited range for session parameters according to the first exemplary embodiment.

FIG. 12 is a diagram schematically illustrating an eighth example of an inherited range for a session parameter according to the first exemplary embodiment. Here, it is assumed that the communication source node 10 attempts to newly start a session with the communication destination node 11, and the parameter storage unit 25 stores a session parameter learned through a session #SD4 between the communication source node 10 (#2) and the communication destination node 11 (#2). Furthermore, it is assumed that the communication source node 10 (#2) is located in a subnet different from where the communication source node 10 is but is located in the site same as the communication source node 10, and the communication destination node 11 (#2) is located in a subnet different from where the communication destination node 11 is but is located in the site same as the communication destination node 11.

In an example illustrated in FIG. 12, in the case where the predetermined lower limit value described above is set to a value corresponding to a certain site, the parameter checker 27 extracts, from the parameter storage unit 25, an entry corresponding to the session #SD4 between the communication source node 10 (#2) and the communication destination node 11 (#2). With this operation, the session parameter learned through the session #SD4 between the communication source node 10 (#2) and the communication destination node 11 (#2) is inherited by a new session (inherited ranges #D2 and #S2).

It should be noted that the set value of the lower limit described above is not limited to the value indicating the subnet or site as described above. Any value may be set, provided that such a value is smaller than the total number of bits in the IP address, and indicates a network range in which communication conditions are close to each other. Note that the predetermined lower limit value to be compared with the number of bits matched in the communication destination IP address may be set separately from the predetermined lower limit value to be compared with the number of bits matched in the communication source IP address.

Operation and Effect of First Exemplary Embodiment

As described above, in the first exemplary embodiment, the session parameters learned through the sessions between communication nodes are stored in the parameter storage unit 25 so that these session parameters are not deleted in response to ending of each of the sessions. Then, an entry whose inherited range includes a session to be newly started is extracted from among plural entries stored in the parameter storage unit 25, and a session parameter contained in this entry is used as an initial value for the session to be newly started.

Thus, according to the first exemplary embodiment, since the session parameter learned through the previous session is inherited by the session to be newly started, it is possible to omit, in the session to be newly started, the overlapping learning process and finding process. More specifically, a window size learned through a slow-start algorithm in the previous session is set as an initial value of the session to be newly started, and hence, it is possible to establish a communication in an optimized state from the beginning in the session to be newly started without performing the slow-start algorithm.

Furthermore, in the first exemplary embodiment, the parameter checker 27 uses the predetermined lower limit value to specify the session parameter to be inherited. Thus, it is possible to extensively enjoy the above-described effect with the small amount of learning (the number of entries in the parameter storage unit 25).

Furthermore, session parameters to be inherited are narrowed down according to session identification information prioritized in descending order starting from the largest degree of the session identification information indicating the closest communication conditions. More specifically, types of protocol and a communication destination IP address are set to the first priority, a communication source IP address is set to the second priority, a communication destination port number is set to the third priority, and a communication source port number is set to the fourth priority. This is because communication conditions are most affected by network states in which the communication destination node 11 is located.

Second Exemplary Embodiment

Figure 13:
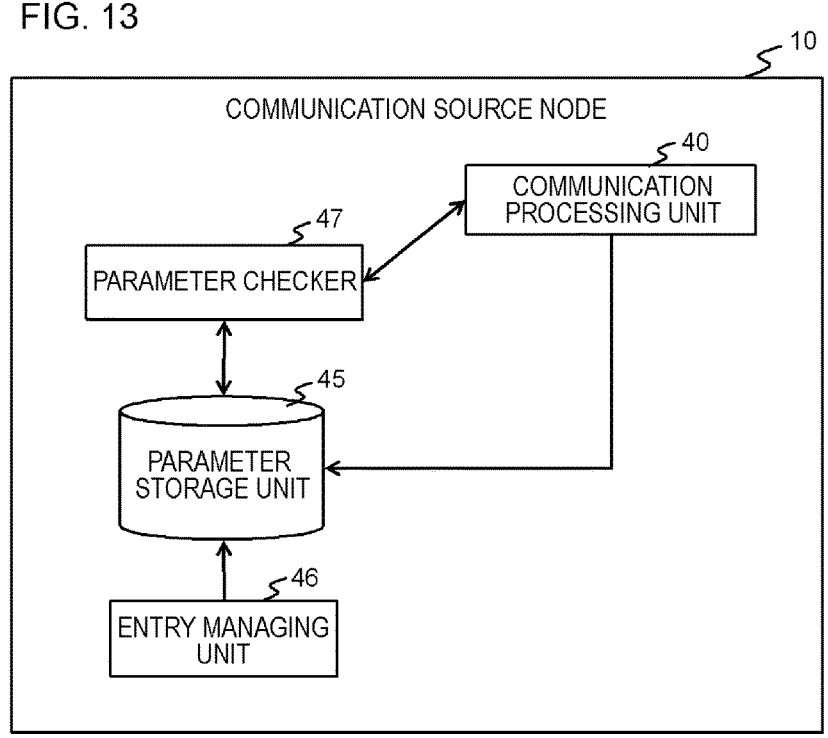
FIG. 13 is a diagram schematically illustrating an example of a process configuration of a communication source node according to a second exemplary embodiment.

In the first exemplary embodiment described above, the session parameters such as a window size and an RTT are inherited. However, the communication parameters to be inherited are not limited to the session parameters. In the second exemplary embodiment, an example is given in which communication-destination unreachable information is inherited. FIG. 13 is a diagram schematically illustrating an example of a process configuration of a communication source node 10 according to a second exemplary embodiment. Below, the communication source node 10 according to the second exemplary embodiment will be described with focus being placed on things different from the first exemplary embodiment.

The communication source node 10 according to the second exemplary embodiment includes, for example, a communication processing unit 40, a parameter storage unit 45, an entry managing unit 46, and a parameter checker 47. In the communication source node 10, each of the processing units described above is realized with the CPU 5 running a program stored in the memory 6.

The communication processing unit 40 stores, in the parameter storage unit 45, communication-destination unreachable information received in association with a previous communication, so as to be associated with, for example, a communication destination IP address of this communication. The communication-destination unreachable information is notified to the communication source node 10, for example, in accordance with Type 3 in Internet Control Message Protocol (ICMP).

FIG. 14 is a diagram illustrating an example of data in the parameter storage unit 45 according to the second exemplary embodiment. The parameter storage unit 45 stores, for each communication destination IP address, a prefix length and a type of unreachability. The parameter storage unit 45 may be also called a connection-state storage unit. As illustrated in FIG. 14, the type of unreachability includes, for example, Network Unreachable, Host Unreachable, and Service Unreachable. Note that the type of unreachability is not limited to those described above. As for the type of unreachability, for example, codes of Type 3 in ICMP are stored. Code 0 of Type 3 in ICMP represents Network Unreachable, and Code 1 represents Host Unreachable.

The parameter checker 47 searches for communication-destination unreachable information stored in the parameter storage unit 45 in response to a request from the communication processing unit 40, and judges whether it is possible to establish a communication to be newly started, which is specified by the communication processing unit 40. This judgment is made, for example, for each type of unreachability in the parameter storage unit 45.

In the case of Network Unreachable, the parameter checker 47 processes in the following manner with records of Network Unreachable in the parameter storage unit 45 as the target. The parameter checker 47 judges whether, in the target records, there is any record in which the network prefix corresponding to prefix lengths in respective records are matched between the communication destination IP address of the communication to be newly started and communication destination IP addresses of respective records. If any matching record exists, the parameter checker 47 judges that the communication to be newly started cannot be established.

In the case of Host Unreachable, the parameter checker 47 judges whether, in records of Host Unreachable in the parameter storage unit 45, there is any record whose communication destination IP address matches with the communication destination IP address of the communication to be newly started. If any matching record exists, the parameter checker 47 judges that the communication to be newly started cannot be established.

The parameter checker 47 notifies the communication processing unit 40 of the judgment results described above, in other words, whether or not the communication can be established. On the basis of the notification from the parameter checker 47, the communication processing unit 40 can judge, before the start of the new communication, whether this communication can be established.

The entry managing unit 46 manages entries in the parameter storage unit 45. Even if there occurs any failure in a certain communication destination node or a network of a communication destination during previous communications, this situation recovers. Thus, the entry managing unit 46 holds predetermined validity period information, and deletes an entry for which this predetermined validity period elapses after the last update. Furthermore, in connection with an entry showing Network Unreachable, in the case where the entry managing unit 46 is notified by the communication processing unit 40 that a communication between the entry and a communication destination node having the network prefix same as this entry succeeds, the entry managing unit 46 may delete this entry.

Operation and Effect of Second Exemplary Embodiment

As described above, in the second exemplary embodiment, the communication-destination unreachable information received in response to the previous communication is stored in the parameter storage unit 45, and this communication-destination unreachable information is inherited by the communication to be newly started. With this operation, it is possible to eliminate an unnecessary process in which a new communication such as session establishment is performed again to a communication destination node for which it has been learned through the previous communication that no communication can be possible.

Third Exemplary Embodiment

Figure 15:
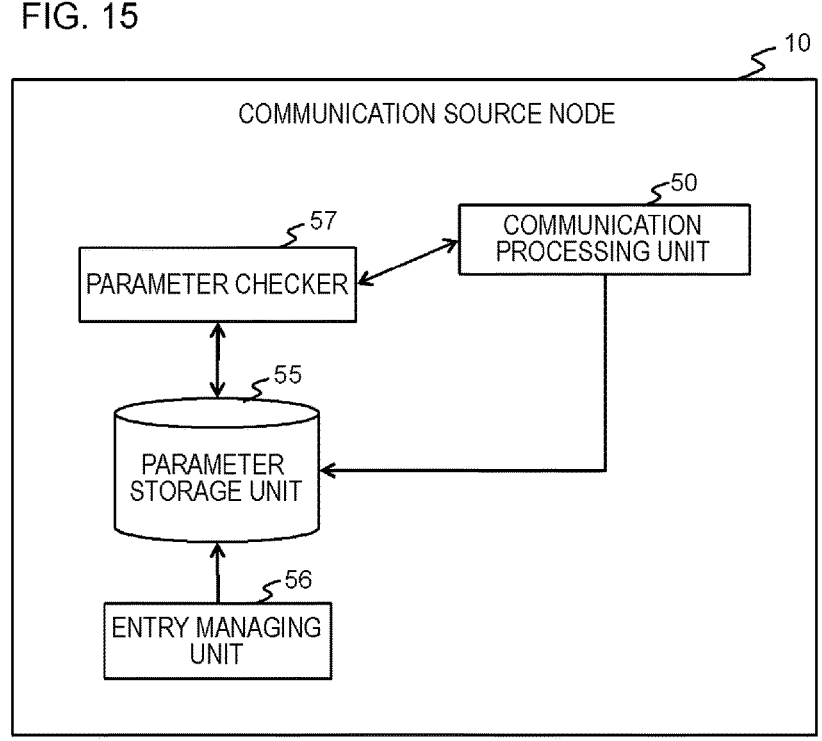
FIG. 15 is a diagram schematically illustrating an example of a process configuration of a communication source node according to a third exemplary embodiment.

In the third exemplary embodiment, an example is given in which Path MTU is inherited as the communication parameter to be inherited. FIG. 15 is a diagram schematically illustrating an example of a process configuration of a communication source node 10 according to a third exemplary embodiment. Below, the communication source node 10 according to the third exemplary embodiment will be described with focus being placed on things different from the first exemplary embodiment and the second exemplary embodiment.

The communication source node 10 according to the third exemplary embodiment includes, for example, a communication processing unit 50, a parameter storage unit 55, an entry managing unit 56, and a parameter checker 57. In the communication source node 10, each of the processing units described above is realized with the CPU 5 running a program stored in the memory 6.

The communication processing unit 50 performs Path Maximum Transmission Unit (MTU) Discovery, and stores, in the parameter storage unit 55, a Path MTU value obtained through this Path MTU Discovery so as to be associated with a communication source IP address and a communication destination IP address. The Path MTU value is notified with a message of Code 4 of Type 3 in ICMP. Note that Path MTU Discovery is a known technique, and hence, descriptions thereof will not be made herein.

FIG. 16 is a diagram illustrating an example of data in the parameter storage unit 55 according to the third exemplary embodiment. The parameter storage unit 55 stores Path MTU values concerning each pair of the communication destination IP address and the communication source IP address. The Path MTU values are the minimum MTU values in the path from the communication destination IP address to the communication source IP address.

The parameter checker 57 searches the Path MTU values stored in the parameter storage unit 55 in response to a request from the communication processing unit 50, and acquires a Path MTU value as an initial value of a communication parameter for a communication to be newly started specified by the communication processing unit 50. With the parameter checker 57, the Path MTU value acquired through Path MTU Discovery in a previous communication is inherited not only by paths between communication ends (a pair of a communication source IP address and a communication destination IP address) fully matching with each other, and the inheritance is extended to paths having Path MTU values equal to each other.

More specifically, the parameter checker 57 extracts, from the parameter storage unit 55, one or more entries in which the number of bits matched in the communication destination IP address is the maximum and more than or equal to a predetermined lower limit value, and extracts, from among the extracted entries, an entry in which the number of bits matched in the communication source IP address is the maximum and more than or equal to a predetermined lower limit value. The parameter checker 57 acquires a Path MTU value of the entry extracted as described above, as an initial value of a communication parameter for the communication to be newly started. The parameter checker 57 provides the communication processing unit 50 with the acquired Path MTU value.

The inherited range for this Path MTU value is based on an idea similar to the inherited range for the session parameter according to the first exemplary embodiment. Thus, the predetermined lower limit value described above is set in advance so as to indicate a network area in which the same Path MTU value can be taken between different paths, and is stored in the memory.

The entry managing unit 56 manages entries stored in the parameter storage unit 55. For example, the entry managing unit 56 performs, for example, data aging and garbage collection.

Operation and Effect of Third Exemplary Embodiment

As described above, in the third exemplary embodiment, the Path MTU value acquired through Path MTU Discovery performed in the previous communication is stored in the parameter storage unit 55, and the Path MTU value is inherited by the communication to be newly started. With this operation, in subsequent communications by which the Path MTU value is inherited, it is possible to use appropriate Path MTU values from the beginning, and hence, it is not necessary to perform Path MTU Discovery. This makes it possible to efficiently perform communications thereafter while effectively using communication bandwidths.

Furthermore, in the third exemplary embodiment, the parameter checker 57 uses the predetermined lower limit value to identify the Path MTU value to be inherited, and hence, it is possible to extensively enjoy the above-described effect even if the number of Path MTU values in the parameter storage unit 55 is small.

Supplemental Remarks for Exemplary Embodiments

In connection with each of the exemplary embodiments described above, it may be possible to employ a mode in which all of the exemplary embodiments are combined, or employ a mode in which two or more of the exemplary embodiments are combined. In the case where the exemplary embodiments are combined, the parameter storage unit (25, 45, and 55) in each of the exemplary embodiments may be realized with one table (cache), or may be realized with tables different from each other.

MODIFICATION EXAMPLES

Each modification example below is applicable to each of the exemplary embodiments described above.

First Modification Example

In addition to the session information managed by the session information managing unit 21 of the communication source node 10 itself, the parameter storage unit 25 may store session parameters of session information managed by the session information managing unit 21 of another communication node. Furthermore, in the case where plural virtual machines are realized on the communication source node 10, the parameter storage unit 25 may store not only the session information managed by the session information managing unit 21 of one virtual machine on the communication source node 10 but also session parameters of session information managed by the session information managing unit 21 of another virtual machine.

Figure 17:
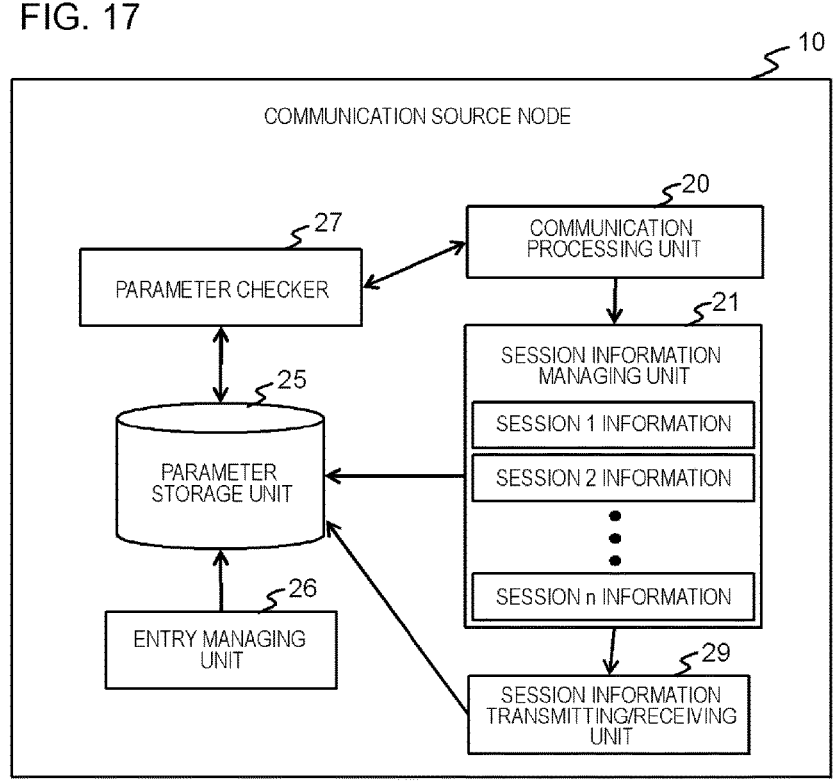
FIG. 17 is a diagram schematically illustrating an example of a process configuration of a communication source node according to a first modification example.

FIG. 17 is a diagram schematically illustrating an example of a process configuration of a communication source node 10 according to a first modification example. FIG. 17 illustrates an example of a process configuration in the case where the first modification example is applied to the first exemplary embodiment. In addition to the configuration of each of the exemplary embodiments described above, the communication source node 10 according to the first modification example further includes a session information transmitting/receiving unit 29. The session information transmitting/receiving unit 29 acquires the session information of another communication node, and stores the acquired session information in the parameter storage unit 25. Furthermore, in response to addition and update (excluding deletion) of session information managed by the session information managing unit 21, the session information transmitting/receiving unit 29 transmits the added and updated session information to another communication node. The session information transmitting/receiving unit 29 may be also called a parameter notification unit.

In the case where plural virtual machines are realized on the communication source node 10, the session information transmitting/receiving unit 29 acquires the session information from another virtual machine other than the virtual machines that realize this session information transmitting/receiving unit 29 itself, and stores the acquired session information in the parameter storage unit 25. In this case, the session information transmitting/receiving unit 29 transmits the added and updated session information to another virtual machine. With this configuration, it is possible to inherit communication parameters learned between the virtual machines.

Second Modification Example

Figure 18:
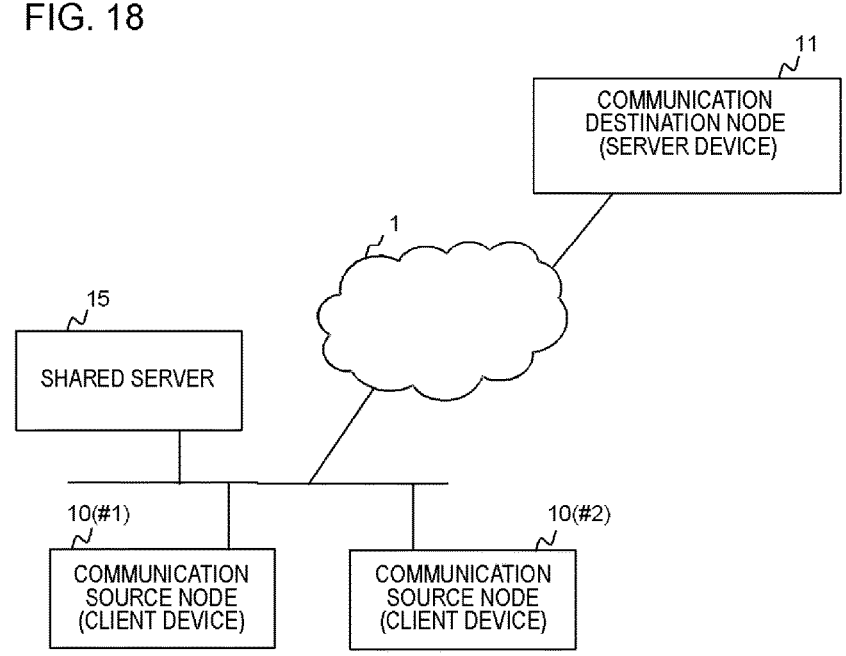
FIG. 18 is a diagram schematically illustrating an example of a system configuration according to a second modification example.

Furthermore, parameter storage units 25 may be placed on a shared server in a centralized manner. FIG. 18 is a diagram schematically illustrating an example of a system configuration according to a second modification example. As illustrated in FIG. 18, in the second modification example, a shared server 15 is additionally provided so as to be connected to communication source nodes 10 (#1) and 10 (#2) in a predetermined range so as to be communicated with each other. This predetermined range may be set so as to be equal to the above-described inherited range for communication source nodes for session parameters. Note that, in the second modification example, the number of the shared servers 15 is not limited.

Figure 19:
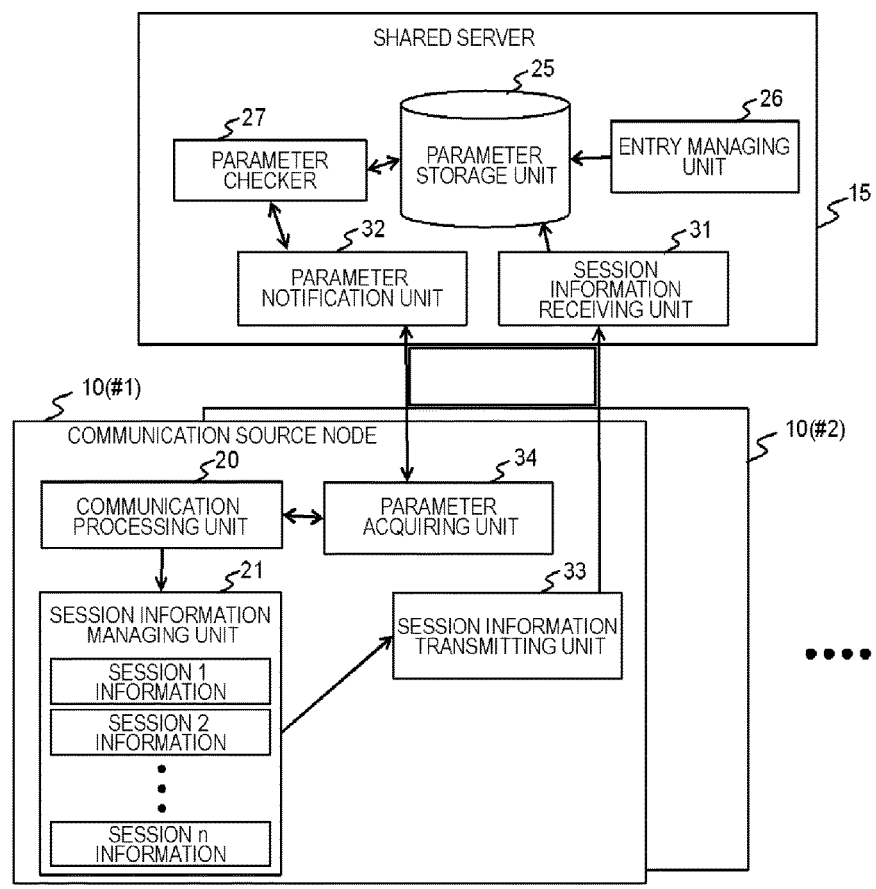
FIG. 19 is a diagram schematically illustrating an example of a process configuration of a shared server and a communication source node according to the second modification example.

FIG. 19 is a diagram schematically illustrating an example of a process configuration of the shared server 15 and the communication source nodes 10 according to the second modification example. FIG. 19 illustrates an example of a process configuration in the case where the second modification example is applied to the first exemplary embodiment. Hereinafter, it is only necessary that the communication source nodes 10 (#1) and 10 (#2) illustrated in FIG. 18 and FIG. 19 have the same process configuration, and hence, are denoted as communication source nodes 10 unless they need to be separately expressed.

The communication source node 10 according to the second modification example includes, for example, the communication processing unit 20, the session information managing unit 21, a session information transmitting unit 33, and a parameter acquiring unit 34. The communication processing unit 20 and the session information managing unit 21 are similar to those in the first exemplary embodiment, and hence, explanation thereof will not be repeated. The session information transmitting unit 33 and the parameter acquiring unit 34 are realized with the CPU 5 running a program stored in the memory 6 as is the case with the other processing units.

In response to addition and update (excluding deletion) of session information managed by the session information managing unit 21, the session information transmitting unit 33 transmits the added and updated session information to the shared server 15. The parameter acquiring unit 34 transmits, to the shared server 15, a request for an initial value of a session parameter from the communication processing unit 20, and receives, from the shared server 15, the initial value acquired by the parameter checker 27 to pass this initial value to the communication processing unit 20.

The shared server 15 according to the second modification example includes, for example, the parameter storage unit 25, the entry managing unit 26, the parameter checker 27, a session information receiving unit 31, and a parameter notification unit 32. The shared server 15 is a computer, and each of the processing units thereof is realized with the CPU 5 running a program stored in the memory 6. The parameter storage unit 25, the entry managing unit 26, and the parameter checker 27 are similar to those in the first exemplary embodiment, and hence, explanation thereof will not be repeated.

The session information receiving unit 31 receives session information from the communication source node 10, and updates the parameter storage unit 25 on the basis of the received session information. For example, in the case where this session information is newly added information, the session information receiving unit 31 adds, to the parameter storage unit 25, a new entry corresponding to this session information. In the case where this session information is modified information, the session information receiving unit 31 modifies the entry corresponding to this session information on the basis of this session information.

The parameter notification unit 32 notifies the initial value of the session parameter acquired by the parameter checker 27 to the communication source node 10 that starts a new session and uses this initial value. Note that a transmission destination of this initial value is the communication source node 10 serving as the request source of this initial value.

As described above, in the second modification example, session parameters learned by the communication source nodes 10 are centralized in the shared server 15, and the centralized session parameters are shared by plural communication source nodes 10. Thus, according to the second modification example, it is possible to share learned information in plural communication source nodes 10 with each of the communication source nodes 10 while reducing the volume of the memory of each of the communication source nodes 10. Note that, in the second modification example, as described above, a virtual machine may be set as a unit of inheritance. In this case, the session parameters centralized in the shared server 15 are shared by plural virtual machines.

It should be noted that the parameter checker 27 may be realized on each of the communication source nodes 10. In this case, it is only necessary that the parameter checker 27 searches the parameter storage unit 25 through a network. With this configuration, it is possible to customize the parameter checker 27 for each of the communication source nodes 10.

Other Exemplary Embodiments

As described above, in TCP communications, the window size is adjusted in each connection through a slow-start algorithm. The slow-start algorithm is a method in which a communication starts on the assumption that the network used has poor performance, and then, states of the network are slowly learned over a long period of time. Thus, in a high-performance network, the time for learning the network states during the slow-start algorithm may be unnecessary. Currently, there is no means that can solve such a problem.

In this respect, in each of the exemplary embodiments described above, sufficient effects can be obtained even if the parameter checkers 27, 47, and 57 do not expand the inherited range for the learned communication parameters. In other words, the communication control device as described below can solve the problem described above.

A communication control device includes: a parameter storage unit that stores an entry containing a window size learned through a L4 communication between communication nodes, a communication source IP address of this L4 communication, and a communication destination IP address of this L4 communication; and a parameter acquiring unit that acquires a communication source IP address and a communication destination IP address in a newly established connection, and acquires, as an initial value of the newly established connection, a window size corresponding to this communication source IP address and this communication destination IP address from the parameter storage unit.

More specifically, in each of the exemplary embodiments described above, it may be possible to employ a configuration in which the parameter checkers 27, 47, and 57 inherit a communication parameter (window size) in an entry containing a matching pair of the communication source IP address and the communication destination IP address. With this mode, it is also possible to eliminate the unnecessary learning time as a result of the slow-start algorithm.

All or part of the exemplary embodiments and the modification examples described above can be specified in a manner described in the Supplementary Notes below. However, the exemplary embodiments and the modification examples are not limited to the descriptions below.
(Supplemental Note 1)

A communication control device including a parameter storage unit that stores each entry containing a communication parameter learned through a communication between communication nodes, a communication source IP address related to this communication, and a communication destination IP address related to this communication; and a parameter acquiring unit that acquires a communication source IP address and a communication destination IP address related to a communication to be newly started, extracts, from among plural entries stored in the parameter storage unit, at least one entry in which the number of bits matched between communication source IP addresses or communication destination IP addresses is more than or equal to a predetermined lower limit value which is lower than the total number of bits in an IP address, and acquires, on the basis of the extracted entry, an initial value of a communication parameter to be used in the communication to be newly started.
(Supplemental Note 2)

The communication control device according to Supplemental Note 1, in which the parameter acquiring unit extracts an entry in which the number of bits matched between the communication destination IP addresses is the maximum and more than or equal to the predetermined lower limit value, and extracts, from among the extracted entry, an entry in which the number of bits matched between the communication source IP addresses is the maximum and more than or equal to the predetermined lower limit value.
(Supplemental Note 3)

The communication control device according to Supplemental Note 1 or 2, further including:

a connection-state storage unit that stores communication-destination unreachable information obtained by a communication source node so as to be associated with each of the communication destination IP addresses, in which the parameter acquiring unit searches for the communication-destination unreachable information stored in the connection-state storage unit, on the basis of a communication destination IP address of the communication to be newly started, and judges whether the communication to be newly started is possible.
(Supplemental Note 4)

The communication control device according to Supplemental Note 3, in which the communication-destination unreachable information contains a type of unreachability indicating Network Unreachable, and the parameter acquiring unit judges whether the communication to be newly started is possible by comparing network prefixes between communication destination IP addresses in connection with the communication-destination unreachable information indicating Network Unreachable.

(Supplemental Note 5)
The communication control device according to any one of Supplemental Notes 1 to 4, in which
the communication parameter stored in the parameter storage unit contains a session parameter learned through a session between the communication nodes,
the entry stored in the parameter storage unit further contains a type of protocol, a communication source port number, and a communication destination port number, and
the parameter acquiring unit extracts the entry by further using a type of protocol, a communication destination port number and a communication source port number in the communication to be newly started.

(Supplemental Note 6)
The communication control device according to any one of Supplemental Notes 1 to 5, in which
the communication parameter stored in the parameter storage unit contains Path MTU learned through Path Maximum Transmission Unit (MTU) Discovery.

(Supplemental Note 7)
The communication control device according to any one of Supplemental Notes 1 to 6, further including:
a parameter receiving unit that receives the communication parameter from another communication node other than the communication control device, or another virtual machine other than a certain virtual machine, and stores an entry containing the received communication parameter in the parameter storage unit; and
a parameter notification unit that notifies the other communication node or the other virtual machine that newly starts a communication, of the initial value of the communication parameter acquired by the parameter acquiring unit.

(Supplemental Note 8)
The communication control device according to any one of Supplemental Notes 1 to 7, further including:
an entry managing unit that judges a degree of stability of each network that realizes each communication corresponding to each of the entries stored in the parameter storage unit, and deletes the entry according to the degree of stability of the network.

(Supplemental Note 9)
A communication control method including:
storing, in a parameter storage unit, each entry containing a communication parameter learned through a communication between communication nodes, a communication source IP address related to this communication, and a communication destination IP address related to this communication;
acquiring a communication source IP address and a communication destination IP address related to a communication to be newly started;
extracting, from among plural entries stored in the parameter storage unit, at least one entry in which the number of bits matched between communication source IP addresses or communication destination IP addresses is more than or equal to a predetermined lower limit value which is lower than the total number of bits in an IP address; and
acquiring, on the basis of the extracted entry, an initial value of a communication parameter to be used in the communication to be newly started.

(Supplemental Note 10)
The communication control method according to Supplemental Note 9, in which
said extracting the at least one entry includes extracting an entry in which the number of bits matched between the communication destination IP addresses is the maximum and more than or equal to the predetermined lower limit value, and extracting, from among the extracted entry, an entry in which the number of bits matched between the communication source IP addresses is the maximum and more than or equal to the predetermined lower limit value.

(Supplemental Note 11)
The communication control method according to Supplemental Note 9 or 10, further including:
storing, in a connection-state storage unit, communication-destination unreachable information obtained by a communication source node so as to be associated with each of the communication destination IP addresses, and
judging whether the communication to be newly started is possible, by searching for the communication-destination unreachable information stored in the connection-state storage unit, on the basis of a communication destination IP address of the communication to be newly started.

(Supplemental Note 12)
The communication control method according to Supplemental Note 11, in which
the communication-destination unreachable information contains a type of unreachability indicating Network Unreachable, and
said judging includes comparing network prefixes between communication destination IP addresses in connection with the communication-destination unreachable information indicating Network Unreachable.

(Supplemental Note 13)
The communication control method according to any one of Supplemental Notes 9 to 12, in which
the communication parameter stored in the parameter storage unit contains a session parameter learned through a session between the communication nodes,
the entry stored in the parameter storage unit further contains a type of protocol, a communication source port number, and a communication destination port number, and
the communication control method further includes extracting the entry by further using a type of protocol, a communication destination port number, and a communication source port number in the communication to be newly started.

(Supplemental Note 14)
The communication control method according to any one of Supplemental Notes 9 to 13, in which
the communication parameter stored in the parameter storage unit contains Path MTU learned through Path Maximum Transmission Unit (MTU) Discovery.

(Supplemental Note 15)
The communication control method according to any one of Supplemental Notes 9 to 14, further including:
receiving the communication parameter from another communication node other than the communication control device, or another virtual machine other than a certain virtual machine;
storing an entry containing the received communication parameter in the parameter storage unit; and
notifying said another communication node or said another virtual machine that newly starts a communication, of the initial value of the communication parameter acquired.

(Supplemental Note 16)
The communication control method according to any one of Supplemental Notes 9 to 15, further including:
judging a degree of stability of each network that realizes each communication corresponding to each of the entries stored in the parameter storage unit; and
deleting the entry stored in the parameter storage unit according to the degree of stability of the network.

(Supplemental Note 17)

A program that causes a computer to perform the communication control method according to any one of Supplemental Notes 9 to 16.

(Supplemental Note 18)

A storage medium that records the program according to Supplemental Note 17 in a computer-readable manner.

The invention claimed is:

1. A communication control device comprising:
a processor and a memory, the processor being configured to provide:
a managing unit configured to manage information on each communication between communication nodes, the information containing a communication parameter learned through the communication between the communication nodes;
a parameter storage unit configured to store a plurality of entries in the memory, each entry containing the communication parameter of the each communication managed by the managing unit, and a pair of a communication source IP address related to this communication and a communication destination IP address related to this communication, at least one pair having a combination of the communication source IP address and the communication destination IP address different from that of another pair; and
a parameter acquiring unit configured to acquire a communication source IP address and a communication destination IP address related to a communication to be newly started, extract, from among the plurality of entries stored in the parameter storage unit, at least one entry in which the number of bits matched between communication source IP addresses or communication destination IP addresses is more than or equal to a predetermined lower limit value which is lower than the total number of bits in an IP address, and acquire, on the basis of the extracted entry, an initial value of a communication parameter to be used in the communication to be newly started,
wherein the communication parameter includes at least one among port numbers of the communication destination and the communication source, Path MTU (Maximum Transmission Unit), a window size, RTT (Round Trip Time), a retransmission timer, information representing a possibility of communication with the communication destination node, information representing a cause of impossibility of communication, information on a PCB (protocol control block), and information on a TCP (Transmission Control Protocol) Control Block.

2. The communication control device according to claim 1, wherein
the parameter acquiring unit is further configured to extract an entry in which the number of bits matched between the communication destination IP addresses is the maximum and more than or equal to the predetermined lower limit value, and extract, from among the extracted entry, an entry in which the number of bits matched between the communication source IP addresses is the maximum and more than or equal to the predetermined lower limit value.

3. The communication control device according to claim 1, wherein the processor is further configured to provide:
a connection-state storage unit configured to store communication-destination unreachable information obtained by a communication source node so as to be associated with each of the communication destination IP addresses, wherein
the parameter acquiring unit is further configured to search for the communication-destination unreachable information stored in the connection-state storage unit, on the basis of a communication destination IP address of the communication to be newly started, and judge whether the communication to be newly started is possible.

4. The communication control device according to claim 3, wherein
the communication-destination unreachable information contains a type of unreachability indicating Network Unreachable, and
the parameter acquiring unit is further configured to judge whether the communication to be newly started is possible by comparing network prefixes between communication destination IP addresses in connection with the communication-destination unreachable information indicating Network Unreachable.

5. The communication control device according to claim 1, wherein
the communication parameter stored in the parameter storage unit contains a session parameter learned through a session between the communication nodes,
the entry stored in the parameter storage unit further contains a type of protocol, a communication source port number, and a communication destination port number, and
the parameter acquiring unit is further configured to extract the entry by further using a type of protocol, a communication destination port number and a communication source port number in the communication to be newly started.

6. The communication control device according to claim 5, wherein the managing unit is further configured to update and add the session parameter which is learned through each session, and reflect details of the communication parameters in the parameter storage unit in response to updating and adding of the session parameter on the each session by the managing unit.

7. The communication control device according to claim 5, wherein the parameter acquiring unit is further configured to make session parameters to be inherited narrowed down according to the session parameters prioritized in descending order starting from the largest degree of session identification information indicating the closest communication conditions, and
the prioritized session parameters include:
types of protocol and a communication destination IP address which are set to a first priority;
a communication source IP address which is set to a second priority;
a communication destination port number which is set to a third priority; and
a communication source port number which is set to a fourth priority.

8. The communication control device according to claim 1, wherein
the communication parameter stored in the parameter storage unit contains Path MTU learned through Path Maximum Transmission Unit (MTU) Discovery.

9. The communication control device according to claim 1, wherein the processor is further configured to provide:
a parameter receiving unit configured to receive the communication parameter from another communication node other than the communication control device, or another virtual machine other than a certain virtual machine, and store an entry containing the received communication parameter in the parameter storage unit; and a parameter notification unit configured to notify said another communication node or said another virtual machine that newly starts a communication, of the initial value of the communication parameter acquired by the parameter acquiring unit.

10. The communication control device according to claim 1, wherein the processor is further configured to provide:

an entry managing unit configured to judge a degree of stability of each network that realizes each communication corresponding to each of the entries stored in the parameter storage unit, and delete the entry according to the degree of stability of the network.

11. The communication control device according to claim 10, wherein the managing unit is further configured to delete an entry from the parameter storage unit after a predetermined validity period elapsing from the last updated time.

12. A communication control method, including:

managing information on each communication between communication nodes, the information containing a communication parameter learned through the communication between the communication nodes;

storing, in a parameter storage unit, a plurality of entries, each entry containing the communication parameter of the each managed communication, a pair of a communication source IP address related to this communication and a communication destination IP address related to this communication, at least one pair having a combination of the communication source IP address and the communication destination IP address different from that of another pair;

acquiring a communication source IP address and a communication destination IP address related to a communication to be newly started;

extracting, from among the plurality of entries stored in the parameter storage unit, at least one entry in which the number of bits matched between communication source IP addresses or communication destination IP addresses is more than or equal to a predetermined lower limit value which is lower than the total number of bits in an IP address; and acquiring, on the basis of the extracted entry, an initial value of a communication parameter to be used in the communication to be newly started, wherein the communication parameter includes at least one among port numbers of the communication destination and the communication source, Path MTU (Maximum Transmission Unit), a window size, RTT (Round Trip Time), a retransmission timer, information representing a possibility of communication with the communication destination node, information representing a cause of impossibility of communication, information on a PCB (protocol control block), and information on a TCP (Transmission Control Protocol) Control Block.

13. The communication control method according to claim 12, wherein said extracting the at least one entry includes:

extracting an entry in which the number of bits matched between the communication destination IP addresses is the maximum and more than or equal to the predetermined lower limit value; and extracting, from among the extracted entry, an entry in which the number of bits matched between the communication source IP addresses is the maximum and more than or equal to the predetermined lower limit value.

14. The communication control method according to claim 12, further including:

storing, in a connection-state storage unit, communication-destination unreachable information obtained by a communication source node so as to be associated with each of the communication destination IP addresses, and judging whether the communication to be newly started is possible, by searching for the communication-destination unreachable information stored in the connection-state storage unit, on the basis of a communication destination IP address of the communication to be newly started.

15. The communication control method according to claim 14, wherein the communication-destination unreachable information contains a type of unreachability indicating Network Unreachable, and the judging includes comparing network prefixes between communication destination IP addresses in connection with the communication-destination unreachable information indicating Network Unreachable.

16. The communication control method according to claim 12, wherein the communication parameter stored in the parameter storage unit contains a session parameter learned through a session between the communication nodes, the entry stored in the parameter storage unit further contains a type of protocol, a communication source port number, and a communication destination port number, and the communication control method further includes extracting the entry by further using a type of protocol, a communication destination port number, and a communication source port number in the communication to be newly started.

17. The communication control method according to claim 16, wherein the managing comprises updating and adding the session parameter which is learned through each session and reflecting details of the communication parameters in the parameter storage unit in response to updating and adding of the session parameter on the each session.

18. The communication control method according to claim 16, wherein the communication control method further comprises narrowing down session parameters to be inherited according to the session parameters prioritized in descending order starting from the largest degree of session identification information indicating the closest communication conditions, and the prioritized session parameters include:

types of protocol and a communication destination IP address which are set to a first priority;

a communication source IP address which is set to a second priority;

a communication destination port number which is set to a third priority; and a communication source port number which is set to a fourth priority.

19. The communication control method according to claim 12, wherein the communication parameter stored in the parameter storage unit contains Path MTU learned through Path Maximum Transmission Unit (MTU) Discovery.

20. The communication control method according to claim 12, further including:
receiving the communication parameter from another communication node other than the communication control device, or another virtual machine other than a certain virtual machine;
storing an entry containing the received communication parameter in the parameter storage unit; and
notifying said another communication node or said another virtual machine that newly starts a communication, of the initial value of the communication parameter acquired.

21. The communication control method according to claim 12, further including:
judging a degree of stability of each network that realizes each communication corresponding to each of the entries stored in the parameter storage unit; and
deleting the entry stored in the parameter storage unit according to the degree of stability of the network.

22. The communication control method according to claim 21, wherein the communication control method further comprises deleting an entry from the parameter storage unit after a predetermined validity period elapsing from the last updated time.

23. A non-transitory computer-readable storage medium storing a program for causing a computer to perform a communication control method, the communication control method including:
managing information on each communication between communication nodes, the information containing a communication parameter learned through the communication between the communication nodes;
storing, in a parameter storage unit, a plurality of entries, each entry containing the communication parameter of the each managed communication, a pair of a communication source IP address related to this communication and a communication destination IP address related to this communication, at least one pair having a combination of the communication source IP address and the communication destination IP address different from that of another pair;
acquiring a communication source IP address and a communication destination IP address related to a communication to be newly started;
extracting, from among the plurality of entries stored in the parameter storage unit, at least one entry in which the number of bits matched between communication source IP addresses or communication destination IP addresses is more than or equal to a predetermined lower limit value which is lower than the total number of bits in an IP address; and
acquiring, on the basis of the extracted entry, an initial value of a communication parameter to be used in the communication to be newly started,
wherein the communication parameter includes at least one among port numbers of the communication destination and the communication source, Path MTU (Maximum Transmission Unit), a window size, RTT (Round Trip Time), a retransmission timer, information representing a possibility of communication with the communication destination node, information representing a cause of impossibility of communication, information on a PCB (protocol control block), and information on a TCP (Transmission Control Protocol) Control Block.

\* \* \* \* \*

UNITED STATES PATENT AND TRADEMARK OFFICE
CERTIFICATE OF CORRECTION

PATENT NO. : 10,021,192 B2
APPLICATION NO. : 14/407499
DATED : July 10, 2018
INVENTOR(S) : Hiroshi Kitamura It is certified that error appears in the above-identified patent and that said Letters Patent is hereby corrected as shown below:

In the Specification

Column 10, Description of Embodiments, Line 38; After "node", insert --11--

Signed and Sealed this
Nineteenth Day of February, 2019

Andrei Iancu
*Director of the United States Patent and Trademark Office*